United States Patent
Tomé et al.

(10) Patent No.: US 8,526,692 B2
(45) Date of Patent: Sep. 3, 2013

(54) REDUCTION OF TRANSITIVITY ERRORS IN RADIOTHERAPY IMAGE REGISTRATION

(75) Inventors: Wolfgang Axel Tomé, Madison, WI (US); Edward Thomas Bender, Madison, WI (US); Nicholas Gordon Lance Hardcastle, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 253 days.

(21) Appl. No.: 13/173,481

(22) Filed: Jun. 30, 2011

(65) Prior Publication Data

US 2013/0004034 A1    Jan. 3, 2013

(51) Int. Cl.
G06K 9/00    (2006.01)

(52) U.S. Cl.
USPC ............... 382/128; 128/922; 378/4

(58) Field of Classification Search
USPC ............ 382/100, 128, 129, 130, 131, 132; 128/922; 378/4–27
See application file for complete search history.

(56) References Cited

U.S. PATENT DOCUMENTS

| | | | | |
|---|---|---|---|---|
| 4,241,404 A * | 12/1980 | Lux | | 378/2 |
| 5,963,612 A * | 10/1999 | Navab | | 378/4 |
| 6,754,374 B1 * | 6/2004 | Miller et al. | | 382/128 |
| 6,990,231 B2 * | 1/2006 | Goto | | 382/154 |
| 7,116,808 B2 * | 10/2006 | Ditt et al. | | 382/128 |
| 7,945,117 B2 * | 5/2011 | Hermosillo Valadez et al. | | 382/294 |
| 7,961,925 B2 * | 6/2011 | Chen et al. | | 382/128 |
| 8,131,044 B2 * | 3/2012 | Wollenweber et al. | | 382/131 |
| 2008/0049994 A1 * | 2/2008 | Rognin et al. | | 382/128 |
| 2012/0121154 A1 * | 5/2012 | Xue et al. | | 382/131 |
| 2013/0063434 A1 * | 3/2013 | Miga et al. | | 345/420 |

OTHER PUBLICATIONS

Skrinjar, Oskar, et al., Symmetric and Transitive Registration of Image Sequences, vol. 2008, Article ID 686875, 9 pages, International Journal of Biomedical Imaging, Hindawi Publishing Corporation, Cairo, Egypt.

* cited by examiner

*Primary Examiner* — Anand Bhatnagar
(74) *Attorney, Agent, or Firm* — Boyle Fredrickson S.C.

(57) ABSTRACT

Deformation maps (e.g. deformation vector fields) used for correcting image-type data used in the treatment of patients in radiotherapy may be processed to eliminate inverse inconsistency and transitivity type errors which produce different results depending on the order or path of the calculation of deformation. The correction permits registration of a treatment plan with the changing patient image and accumulation of dose to a common reference frame without transformation dependent artifacts.

21 Claims, 4 Drawing Sheets

US 8,526,692 B2

REDUCTION OF TRANSITIVITY ERRORS IN RADIOTHERAPY IMAGE REGISTRATION

STATEMENT REGARDING FEDERALLY SPONSORED RESEARCH OR DEVELOPMENT

- -

CROSS REFERENCE TO RELATED APPLICATION

- -

BACKGROUND OF THE INVENTION

The present invention relates to radiation therapy in which radiation is applied to a tumor or the like for treatment thereof, and in particular to adaptive/dose-guided radiation therapy where the radiation is applied and monitored according to spatially defined treatment plan and refined if the specific goals of the treatment plan are not being met.

Radiation therapy applies high-energy radiation to cancer cells to selectively destroy those cells, both by focusing the radiation on a tumor site and by relying on increased susceptibility of cancer cells to radiation. The latter, increased susceptibility, results from a diminished ability by cancer cells to repair sub-lethal DNA damage and a higher reproduction rate of cancer cells, which can cause them to be more frequently in phases of cell division that are most susceptible to disruption by radiation.

Improved outcomes in radiation therapy may be obtained by "fractionation" in which a radiation dose is applied in "fractions" spread out over multiple treatments at different times. This fractionation allows healthy cells, which are more efficient in DNA repair, to recover and increases the chance that a given cancer cell will be in a radiation-susceptible division mode at a time of treatment.

In adaptive/dose-guided radiation therapy, a spatially defined treatment plan is prepared defining a desired dose. The treatment plan is defined on an image of the patient, for example taken by CT, PET or MRI imaging or the like, and used to align and control the radiation beams with respect to the patient during each fractional treatment. During treatment, the amount of dose received by each region of tissue during each treatment fraction is monitored. This monitor dose for each treatment fraction may be combined to track the progress of the treatment in meeting the goals of the treatment plan.

The registration of the treatment plan with the patient and the monitoring of radiation dose over time are complicated by changes in the patient and tumor over time, for example, caused by weight loss and tumor shrinkage. For this reason, it is known to acquire new images of the patient at the time of each treatment fraction and to adjust the radiation plan to fit the current image so that radiation is applied correctly to the tissue despite changes in location and area. This yields the measured dose fraction. It is desirable to obtain the combined delivered dose from all treatment fractions to date. Measured dose fractions may be warped to a common reference frame based on one image before being combined. Generally, the treatment plan and measured dose fractions will be termed "image-type" data, reflecting the fact that they share a common coordinate structure with image data and are normally registered with an image.

Registering image-type data by warping or deforming the image-type data may be provided by comparing images taken at different times during the treatment and developing a spatial mapping of corresponding volume elements between images to provide a deformation map. The deformation map may be a deformation vector field (DVF) or a set of points from which mathematical deformations can be derived (e.g. thin plate splines) or other known techniques which describes how the tissue has deformed between images. Such deformation maps can be obtained by wide variety of techniques including for example correlating subregions of the image in a block matching process that determines vectors for the deformation of each block according to regions of highest correlation.

Minor errors in measuring and calculating the deformation maps can make the results of image transformation using deformation maps highly dependent on the sequence of the warping operation. For this reason, for example, warping image A to image B and then warping image B to image A will not yield the original image A. This error is termed "inverse inconsistency error". Further warping image A to image B to image C and then back to image A will not yield the original image A nor will warping image A to image C yield the same image as warping image A to image B and thence to image C. These errors are termed "transitivity errors".

These errors can create uncertainty and confusion in the treatment planning process. One approach to correcting this problem, described in Skrinjar, O., Bistoquet, A., and Tagare, H., Symmetric and Transitive Registration of Image Sequences, Int J Biomed Imaging, 2008, article ID 686875, enforces the use of a predetermined reference image through which all transformations must be undertaken.

SUMMARY OF THE INVENTION

The present invention reduces inverse inconsistency and transitivity errors without requiring transformation through a particular image, and in this way provides flexible image deformation which is largely indifferent to the sequence of deforming step. These results are accomplished by ensuring that individual deformation maps are inverse consistent, for example, by use of the appropriate correlation algorithm or an averaging process that can applied to any deformation map. The invention then produces transitive deformation maps by combining individual, inverse consistent deformation maps for combinations of different deformation pathways between the same endpoint images. The resulting system allows the user to arbitrarily deform image-type data among images with an expectation of consistent result when the deformation endpoints are the same regardless of the particular deformation pathway.

Specifically, the present invention, in one embodiment, provides a program for transforming image-type data, registered to a first image, to a second image using a computer to receive a set of images of a treatment region of a patient representing at least three different image times. In this method Inverse consistent deformation maps are then determined between pairs of images. Transitive deformation maps between pairs of images are then generated where a pair comprises a first and second image, and where the transitive deformation maps combines the inverse consistent deformation maps between the first and second image and the inverse consistent deformation maps between the first and second images via third images of the set other than the first and second images. The transitive deformation maps may then be applied to image-type data, registered to the first image, to register the image-type data to the second image.

It is thus a feature of at least one embodiment of the invention to convert measured deformation maps to transitive deformation maps permitting flexibility in changing the registration of image-type data among different images in arbitrary sequences with reduced or no transformation artifacts.

The image-type data may be a treatment plan indicating a desired dose to the region.

It is thus a feature of at least one embodiment of the invention to permit a treatment plan prepared with a particular planning image to be registered with later images taken at different times in a fractionated treatment while providing consistent results regardless of the sequence of the registration to the later images.

Alternatively, the image-type data may be a dose image describing a received fractionated dose and the fractionated dose registered to the first image may be added to a fractionated dose registered to the second image.

It is thus a feature of at least one embodiment of the invention to permit the accumulation of dose at any of the series of images with consistent results.

The third images include every image of the set of images other than the first and second images.

It is thus a feature of at least one embodiment of the invention to ensure the creation of robust transitive deformation maps that may be applied to images in any order to yield consistent results.

The combination of the inverse consistent deformation vectors may perform an average of the combined inverse consistent DVFs on a vector by vector basis. In one implementation this average may be according to the equation:

$$\vec{\Delta}_{ij}^{T3} = \frac{1}{N-1}\left(\vec{\Delta}_{ij}^{IC} + \sum_{k \in S} \vec{\Delta}_{ikj}^{IC}\right) \text{ where } S = \{s: s \in \{1, \ldots N\} \wedge s \neq i \wedge s \neq j\}$$

where:

$\vec{\Delta}_{ij}^{T3}$ is the transitive deformation vector field between the first and second image;
and $\vec{\Delta}_{ij}^{IC}$ is the inverse consistent DVFs between the first (i) and second (j) image
and $\vec{\Delta}_{ikj}^{IC}$ is the inverse consistent DVFs between the first (i) and second (j) images via a third image, k.

It is thus a feature of at least one embodiment of the invention to provide a mathematically tractable method of generating transitive DVFs.

The invention may form the inverse consistent DVF from a primary and secondary image of each pair by combining a deformation map mapping the primary image to register with the secondary image and a deformation map mapping the secondary image to register with the primary image.

It is thus a feature of at least one embodiment of the invention to provide a method of ensuring inverse consistent deformation maps for deformation maps generated by arbitrary techniques.

The combining may provide an average of the deformation maps on a vector-by-vector basis. In one embodiment the average may be to the equation:

$$\vec{\Delta}_{ij}^{IC} = \frac{1}{2}\left(\vec{\Delta}_{ij} + \vec{\Delta}_{ji}^{-1}\right)$$

where:

$\vec{\Delta}_{ij}^{IC}$ is the inverse consistent deformation map;

$\vec{\Delta}_{ij}$ is the deformation vector field mapping the primary image to register with the secondary image
and $\vec{\Delta}_{ji}^{-1}$ is an inverse of the deformation vector field mapping the secondary image to register with the primary image.

It is thus a feature of at least one embodiment of the invention to provide a method of generating inverse consistent deformation maps without the need to modify the underlying mechanism of generating the deformation map.

These particular objects and advantages may apply to only some embodiments falling within the claims and thus do not define the scope of the invention.

DETAILED DESCRIPTION OF THE PREFERRED EMBODIMENT

Figure 1:
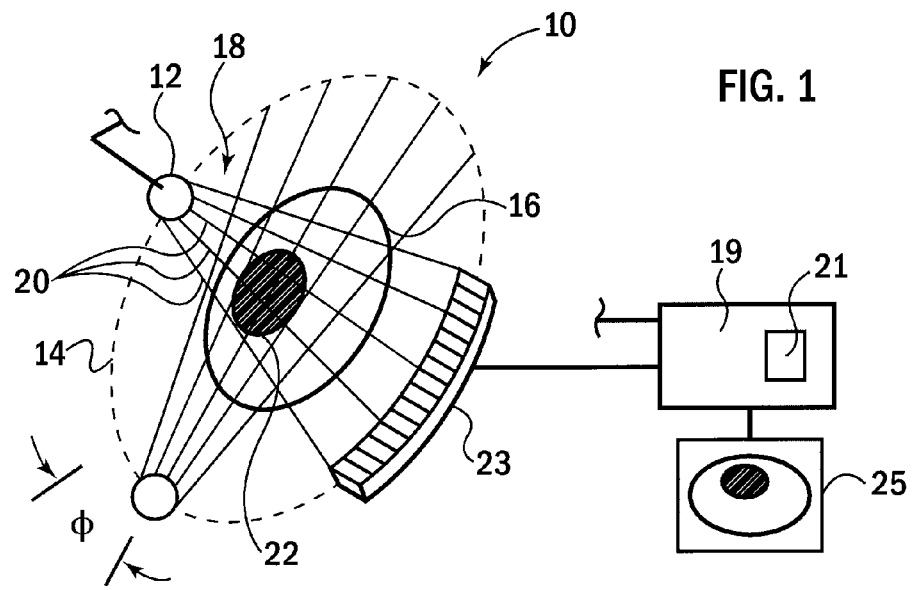
FIG. 1 is a simplified diagram of the components of an intensity modulated radiation therapy system for providing accurate control of radiation dose within a treatment zone.

Referring now to FIG. 1, an example radiation therapy machine 10, suitable for use with the present invention but not limiting the present invention, may provide a radiation source 12 positionable in an orbit 14 about a patient 16 over a range of angles ϕ. The radiation source 12 may provide an intensity modulated radiation beam 18 comprised, for example, of multiple beamlets 20 which may be individually controlled in intensity by a computer 19 executing a stored program 21.

During treatment of the patient 16, the intensity of each beamlets 20 is adjusted as a function of the position ϕ of the radiation source 12 to apply radiation dose, preferentially to a tumor region 22. The varying intensities may be controlled according to a treatment plan, for example, held in the computer 19, where the treatment plan may be converted to a "treatment schedule" describing a relationship between intensities of the beamlets 20 as a function of angular position of the radiation source 12 in the orbit 14. The treatment schedule may be a sinogram holding intensity values as a function of beamlet number and ϕ or other representation understood in the art A portal imaging device 23 may be positioned opposite the patient 16 with respect to a radiation source to provide information to the computer 19 for the determination of dose received by the patient 16 and/or for generating image sets for guiding treatment. Data such as received dose, treatment plan information, and/or images may be output on a display terminal 25 or the like as will be described below.

Figure 2:
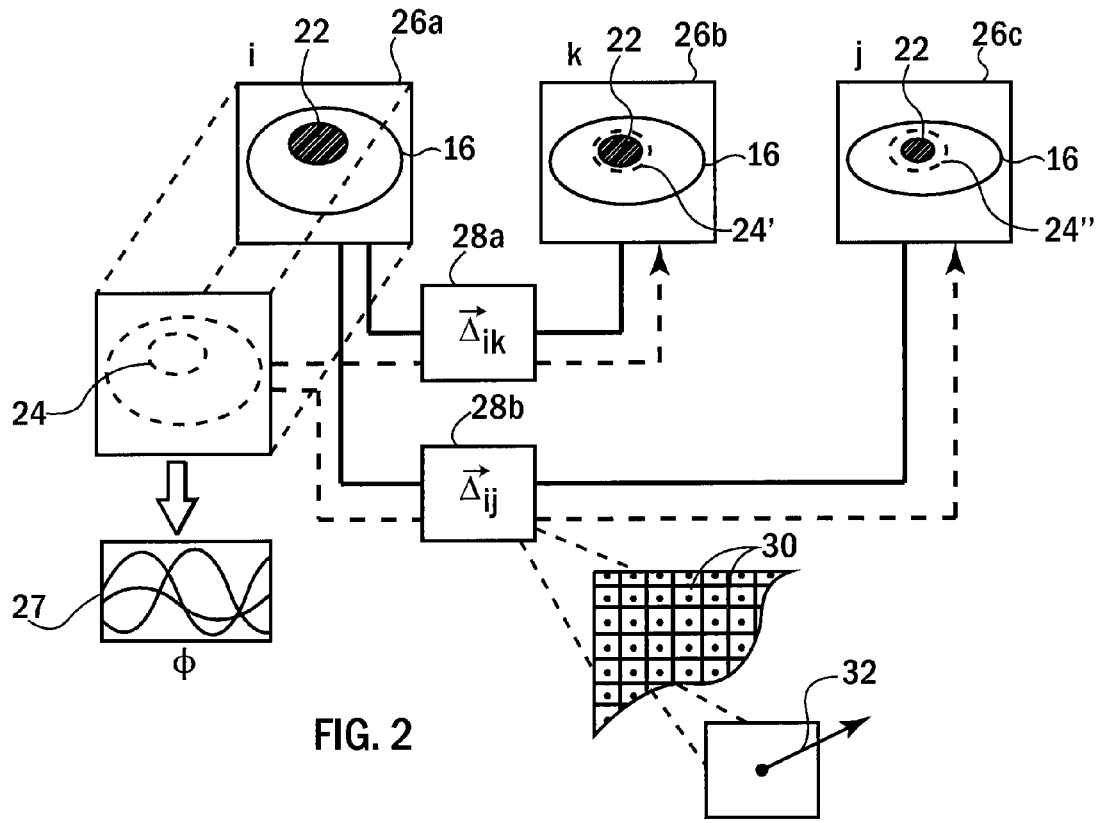
FIG. 2 is a diagrammatic representation of a treatment plan for use with the system of FIG. 1 as warped by DVFs to match changing tissue shape and dimension taken from a set of images acquired at different times in the treatment.

Referring now to FIG. 2, the treatment plan 24 may be prepared with respect to an initial planning image 26a of the patient showing the tumor region 22 and surrounding tissue of the patient 16 and assigning dose limits or ranges to one or more regions related to the tumor region 22 and other regions of the patient 16, for example those having high radiation sensitivity. The treatment plan 24 comprises image-type data registered to the planning image 26a and having generally the same dimensions as the planning image 26a with elements defining dose that map to corresponding pixels in the planning image 26a that map to brightness.

The treatment plan 24 may be used to generate a treatment schedule 27 defining the intensity of each beamlets 20 as a function of the angle φ as described above.

During a fractionated treatment, additional patient images 26b and 26c may be obtained providing depictions of tumor regions 22 and patient 16 as both change over time, for example, with weight loss or gain by the patient 16 and/or shrinkage of the tumor region 22. As the patient 16 changes, the treatment plan 24 will need to be modified so as to conform to the regions of the treatment plan 24 to the changed dimensions of the tissue of the patient 16, for example, from image 26a to image 26b.

Whether modification of the treatment plan 24 is necessary may be assessed by comparing images 26a and 26b to determine how these images 26 have been changed, for example, by correlating small areas of the images with respect to each other in a block matching process to produce a deformation map 28 such as a vector field (DVF) 28a. The DVF 28a may then be applied to the image-type data of the treatment plan 24 to produce a treatment plan 24' registered with the image 26b (and shown superimposed on the image 26b). The actual dose deposited in image 26b may then be compared to the treatment plan 24' to assess whether treatment modification is required. If so, a new treatment plan may be produced using image 26b and a new treatment schedule 27 (not shown) computed for treatment of the patient at the time of image 26b. Similarly a DVF 28b may be computed, for example, between images 26a and 26c and used to map the treatment plan 24 to image 26c as treatment plan 24" for comparison of the cumulative dose to the patient at the time of image 26c (as always be described below).

Each DVF 28 (and generally any deformation map 28) will have dimensions corresponding to the dimensions of the images 26 and may include set of elements 30 (for example, associated with each pixel of the images 26) defining a displacement of the tissue of the corresponding pixel of a source image (e.g. image 26a) when matched to tissue of a target image (e.g. image 26b). In a DVF 28 the elements will be vector 32. As will be understood in the art, each vector 32 has a magnitude (length) and direction (angle) the latter being generally in three dimensions with only two depicted in the figures for clarity. Often the deformation map 28 is not commutative, meaning that a different deformation map 28 is produced when image 26a is the source image and image 26c is the target image as opposed to when image 26a is the target image and image 26c is the source image. When the source and target images are switched, the deformation maps will theoretically be related by one being the inverse of the other, that is, the direction of the vectors 32 being reversed, however in practice measurement and calculation errors prevent this from being the case.

Figure 3:
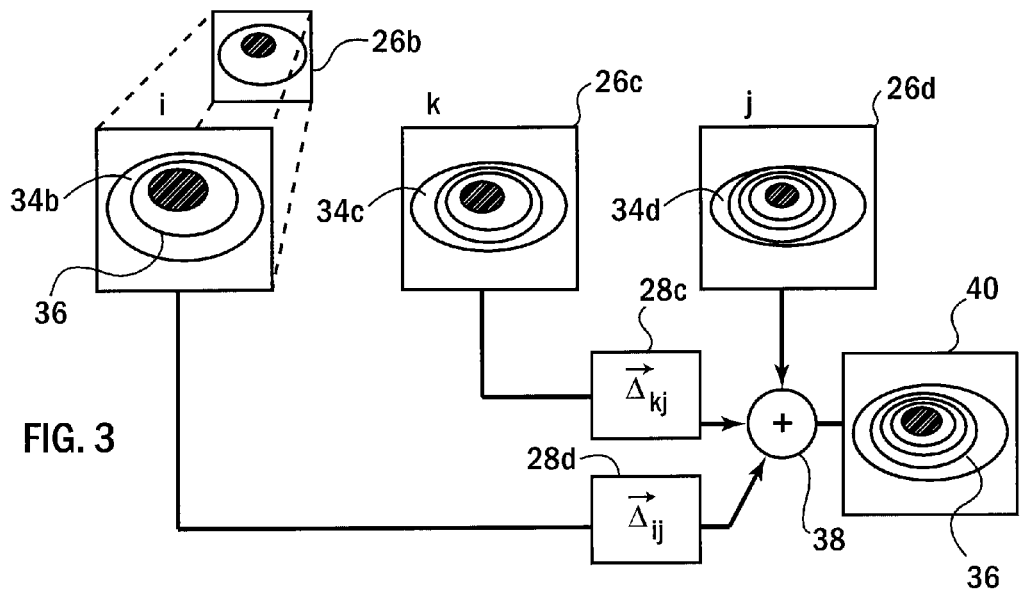
FIG. 3 is a figure similar to that of FIG. 2 showing received dose during each of the different times as warped by DVFs to a common image for determining total dose received.

Referring now to FIG. 3, during the radiation treatment, dose images 34 may be collected indicating dose 36 actually received by the patient 16 in tissue corresponding to pixels of the images 26. For example, multiple dose images 34b-34d may be collected at times corresponding to the acquisition of different images 26b-26d. These dose images 34 will also be termed "image-type" data because they have dimensions corresponding to the dimensions of the images 26 and are registered to a particular image 26. In order to combine these dose images 34 together to obtain a value of the total dose received by the patient 16, DVFs 28c (derived with image 26c as a source image and image 26d as a target image) and DVF 28d (derived with image 26b as a source image and image 26d as a target image) may be used to convert dose image 34b (associated with image 26b) and dose image 34c (associated with image 26c) to a common spatial framework consistent (registered) with image 26d so that they may be summed on a pixel by pixel basis as indicated by process block 38 with the dose image 34d to produce a composite dose image 40.

Figure 4A:
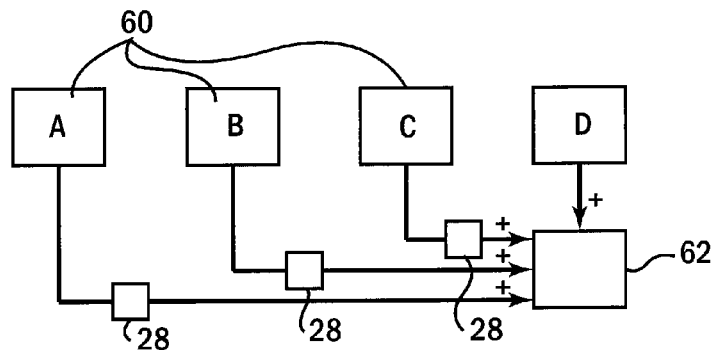
FIGS. 4a-4b are figures similar to those of FIG. 3 showing two sequences of warping received dose to a common reference frame that will typically yield different results as a result of inverse inconsistency and lack of transitivity in the DVFs.
Figure 4B:
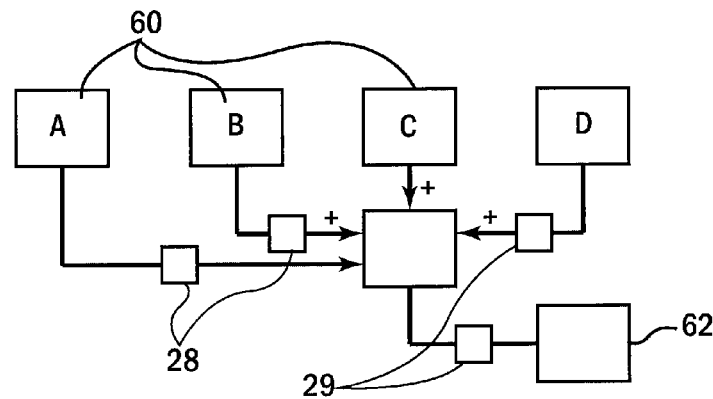

Referring now to FIGS. 4a and 4b, as noted, the determination of DVFs 28 from actual images 26 can lead to imperfections that produce confusing anomalies in transformation of image-type data. For example, if four image-type data sets 60 labeled letter A-D, (and representing treatment plans 24 or dose images 34) are combined using DVF 28 such that image-type data A, B, and C are mapped to register with image-type data D and then summed, as shown in FIG. 4a, to produce combined image 62, that combined image 62 will be visibly and quantitatively different from a combined image 62' produced by a mapping of image-type data A, B, and D to register with image-type data C and summed with image-type data C, and the sum then mapped using a DVF 28 to the reference frame of image D.

This difference between these combined images 62 and 62', resulting from different pathways of the deformation process, is caused by a lack of inverse consistency and transitivity of the DVFs 28. The difference between these combined images 62 and 62' as noted can be confusing to practitioners and could lead to treatment errors.

Figure 5:
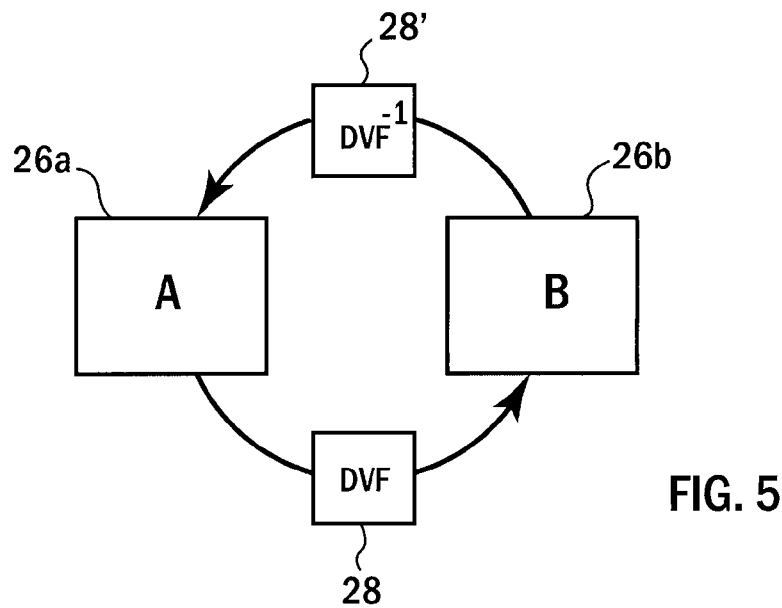
FIG. 5 shows the received DVFs for two images A and B used in producing inverse consistent DVFs for the two images.
Figure 6:
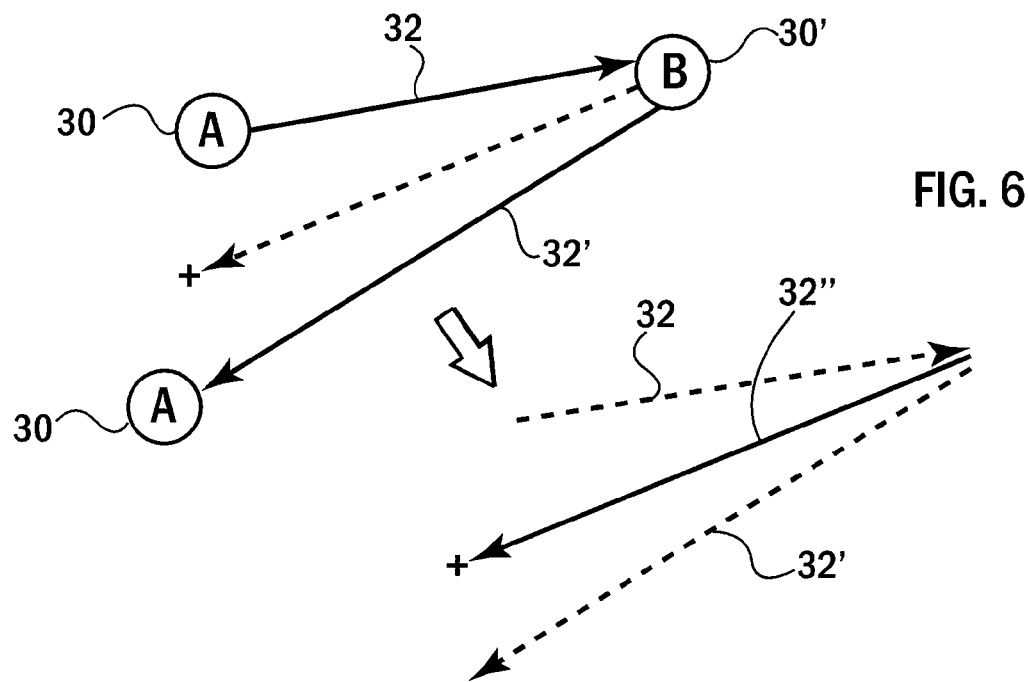
FIG. 6 is a vector diagram showing a combination of received DVFs of FIG. 5 according to the present invention to produce an inverse consistent DVF between an image A and B.

Referring now to FIG. 5, the present invention solves this problem by first correcting for inverse consistency errors. Per the invention, a first DVF 28 may be computed using image 26a as a source image and 26b as a target image and an inverse DVF 28' may be computed using the image 26b as a source image and 26a as a target image. Referring also to FIG. 6, a given vector 32 associated with corresponding data elements 30 and 30' in DVF 28 will have a different length and angle than a vector 32' for the same data elements 30 and 30' associated with DVF 28' as a result of inverse consistency errors. As a first step, the present invention provides an inverse consistent DVF by averaging the vectors 32 and 32' for each data element 30 of DVF 28 and 28' producing average data vector 32" whose magnitude replaces the magnitude of the vectors 32 and 32' for the data elements 30 in the DVFs 28 and 28' and whose angle (or its inverse) provide the angle of the vectors 32 and 32' in the DVFs 28 and 28'. This may be expressed with mathematical precision as a follows:

$$\vec{\Delta}_{ij}^{IC} = \frac{1}{2}\left(\vec{\Delta}_{ij} + \vec{\Delta}_{ji}^{-1}\right)$$

where:

$\vec{\Delta}_{ij}^{IC}$ is the inverse consistent DVF between a source image i and a target image j.

$\vec{\Delta}_{ij}$ is the deformation vector field mapping the source image to register with the target image;

and $\vec{\Delta}_{ji}^{-1}$ is an inverse of the deformation vector field mapping the source image to register with the target image.

The result of this transformation is to provide for DVFs 28 that are inverse consistent regardless of how the underlying DVFs were calculated.

Figure 7:
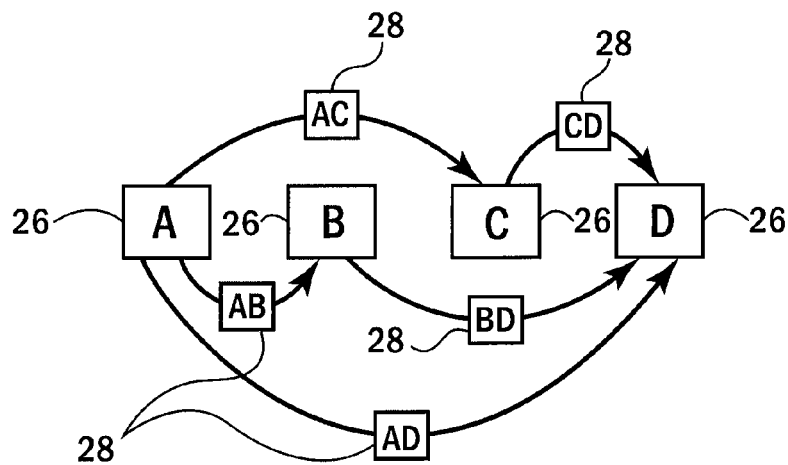
FIG. 7 is a figure similar to that of FIG. 5 showing calculation of DVFs in multiple pathways between an image A and D for producing a transitive DVF between image A and D.

Referring now to FIG. 7, a second step of the present invention modifies the inverse consistent DVFs 28 to eliminate transitivity problems. In this operation transitive DVF 28 between any two images 26 in a sequence, for example images 26a and 26d in a sequence of images 26a-26d, are generated from a composite of the inverse consistent DVFs 28 along every path between the two images 26a and 26d via one other image (e.g. 26b or 26c). Thus DVF 28 labeled AD will combine that DVF 28 with DVFs 28 between A and D via B (AB+BD) and between A and D via C (AC+CD).

Figure 8:
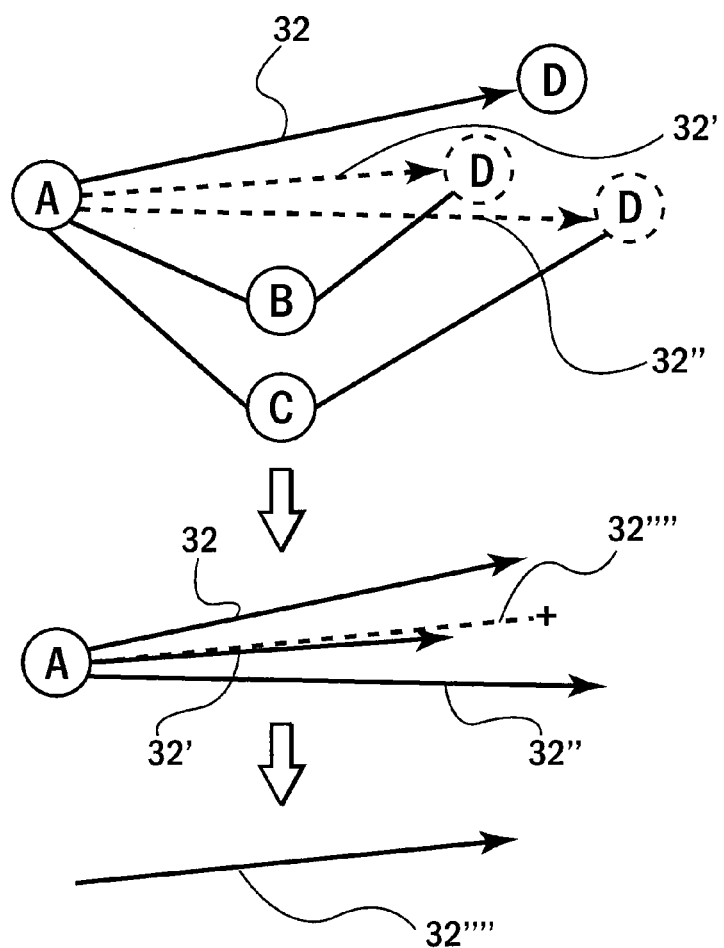
FIG. 8 is a diagram similar to that of FIG. 6 showing combination of the DVFs of FIG. 7 to produce a transitive DVF between images A and D.

Referring to FIG. 8, this process can be illustrated by examining a vector 32 for a given element 30 of the resulting DVFs 28. A given vector 32 of DVF 28 between images A and D will have a different length and angle than a vector 32' being the sum of the DVFs 28 between images A and B and between B and D. These vectors 32 and 32' will also be different in length and angle from the vector 32" being the sum of the DVFs 28 between images A and C and between C and D. In this second step, the present invention provides a "transitive" DVF by averaging the vectors 32, 32' and 32" for each data element 30 of DVFs 28 producing an average data vector 32"" which replaces the vector in the corresponding DVF 28 labeled AD. This process is repeated for each vector 32 of this DVF 28 to make DVF 28 transitive. This process may be then repeated for each DVF 28.

This process may be expressed with mathematical precision as follows:

$$\vec{\Delta}_{ij}^{T3} = \frac{1}{N-1}\left(\vec{\Delta}_{ij}^{IC} + \sum_{k \in S} \vec{\Delta}_{ikj}^{IC}\right) \text{ where } S = \{s : s \in \{1, \ldots N\} \wedge s \neq i \wedge s \neq j\}$$

where:

$\vec{\Delta}_{ij}^{T3}$ is the transitive DVFs between the first and second image;

And $\vec{\Delta}_{ij}^{IC}$ is the inverse consistent DVFs between the first (i) and second (j) image and $\vec{\Delta}_{ikj}^{IC}$ is the inverse consistent DVFs between the first (i) and second (j) images via a third image, k.

Once these transformations are complete, the DVFs 28 as corrected for inverse consistency and transitivity may be used in the applications described with respect to FIGS. 2 and 3 without the introduction of inconsistencies caused by a change in ordering or sequencing of the transformation steps.

It will be appreciated that the present invention is not limited to external beam radiotherapy but may also be used in brachytherapy or other radiation therapy environments.

It will be appreciated that the steps described above may be implemented by the program 21 on the computer 19 or a separate computer system communicating with the computer 19 and acting with the computer 19 to implement a computational system. Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to a computer or processor or its equivalent can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

What we claim is:

1. A computer program fixed in a non-transitory computer readable medium executable on a computer to implement the steps of:
   (a) receiving a set of images of a treatment region of a patient for at least three different image times;
   (b) determining inverse consistent deformation maps each describing a deformation in the treatment region between pairs of images;
   (c) creating a transitive deformation map between at least one pair of the images, the pair comprising a first and second image, the transitive deformation maps combining the inverse consistent deformation maps between the first and second image and the inverse consistent deformation maps between the first and second images via third images of the set other than the first and second images; and
   (d) applying the transitive deformation map to image-type data registered to the first image to register the image-type data with the second image.

2. The computer program of claim 1 wherein the image-type data is a treatment plan indicating a desired dose to the region.

3. The computer program of claim 1 wherein the image-type data is a dose image describing a received fractionated dose.

4. The computer program of claim 1 wherein the image-type data is at least one of the group consisting of a tissue image depicting patient tissue and a treatment plan image depicting a desired dose distribution.

5. The computer program of claim 4 further including the step of accumulating the total dose delivered to an image consistently that does not depend on which image out of the set of images is chosen for total dose accumulation.

6. The computer program of claim 1 wherein the third images include every image of the set of images other than the first and second images.

7. The computer program of claim 6 wherein combining the inverse consistent deformation maps between the first and second image and the inverse consistent deformation maps between the first and second images via third images of the set other than the first and second images, performs an average of the combined inverse consistent DVFs on a element by element basis.

8. The computer program of claim 7 wherein the average is according to the equation:

$$\vec{\Delta}_{ij}^{T3} = \frac{1}{N-1}\left(\vec{\Delta}_{ij}^{IC} + \sum_{k \in S} \vec{\Delta}_{ikj}^{IC}\right) \text{ where } S = \{s : s \in \{1, \ldots N\} \wedge s \neq i \wedge s \neq j\}$$

where $\vec{\Delta}_{ij}^{T3}$ is the transitive and inverse consistent deformation maps between the first and second image and $\vec{\Delta}_{ij}^{IC}$ is the inverse consistent DVFs between the first (i) and second (j) image and $\vec{\Delta}_{ikj}^{IC}$ is the inverse consistent DVFs between the first (i) and second (j) images via a third image, k.

9. The computer program of claim 1 including the step of forming the inverse consistent deformation map from a primary and secondary image of each pair by combining a deformation map mapping the primary image to register with the secondary image and a deformation map mapping the secondary image to register with the primary image.

10. The computer program of claim 9 wherein the combining provides an average of the deformation maps on an element by element basis.

11. The computer program of claim 10 wherein the average is according to the equation:

$$\vec{\Delta}_{ij}^{IC} = \frac{1}{2}\left(\vec{\Delta}_{ij} + \vec{\Delta}_{ji}^{-1}\right)$$

where $\vec{\Delta}_{ij}^{IC}$ is the inverse consistent deformation map;

$\vec{\Delta}_{ij}$ is the deformation map mapping the primary image to register with the secondary image and $\vec{\Delta}_{ji}^{-1}$ is an inverse of the deformation map mapping the secondary image to register with the primary image.

12. A computer executing a stored program to:
(a) receive a set of images of a treatment region of a patient for at least three different image times;
(b) determine inverse consistent deformation maps each describing a deformation in the treatment region between pairs of images;
(c) create a transitive deformation map between at least one pair of the images, the pair comprising a first and second image, the transitive deformation maps combining the inverse consistent deformation maps between the first and second image and the inverse consistent deformation maps between the first and second images via third images of the set other than the first and second images; and
(d) apply the transitive deformation map to image-type data registered to the first image to register the image-type data to the second image.

13. The computer of claim 12 wherein the combining of the inverse consistent deformation maps is according to the equation:

$$\vec{\Delta}_{ij}^{T3} = \frac{1}{N-1}\left(\vec{\Delta}_{ij}^{IC} + \sum_{k \in S} \vec{\Delta}_{ikj}^{IC}\right) \text{ where } S = \{s : s \in \{1, \ldots N\} \wedge s \neq i \wedge s \neq j\}$$

where $\vec{\Delta}_{ij}^{T3}$ is the transitive deformation map between the first and second image and $\vec{\Delta}_{ij}^{IC}$ is the inverse consistent deformation maps between the first and second image and $\vec{\Delta}_{ikj}^{IC}$ is the inverse consistent deformation maps between the first and second images via a third image.

14. The computer of claim 12 including the step of forming the inverse consistent deformation map from a primary and secondary image of each pair by combining a deformation map mapping the primary image to register with the secondary image and a deformation map mapping the secondary image to register with the primary image according to the equation:

$$\vec{\Delta}_{ij}^{IC} = \frac{1}{2}\left(\vec{\Delta}_{ij} + \vec{\Delta}_{ji}^{-1}\right)$$

where $\vec{\Delta}_{ij}^{IC}$ is the inverse consistent deformation map $\vec{\Delta}_{ij}$ is the deformation map mapping the primary image to register with the secondary image and $\vec{\Delta}_{ji}^{-1}$ is an inverse of a deformation map mapping the secondary image to register with the primary image.

15. A method of transforming image-type data registered to a first image to a second image using a computer to implement the steps of:
(a) receiving a set of images of a treatment region of a patient for at least three different image times;
(b) determining inverse consistent deformation maps, each describing a deformation in the treatment region between pairs of images;
(c) create a transitive deformation map between at least one pair of the images, the pair comprising a first and second image, the transitive deformation maps combining the inverse consistent deformation maps between the first and second image and the inverse consistent deformation maps between the first and second images via third images of the set other than the first and second images; and
(d) apply the transitive deformation map to image-type data registered to the first image to register the image-type data to the second image.

16. The method of claim 15 wherein the image-type data is a treatment plan indicating a desired dose to the region.

17. The method of claim 15 wherein the image-type data is a dose image describing a received fractionated dose.

18. The method of claim 17 further including the step of adding the fractionated dose registered to the first image to a fractionated dose registered to the second image.

19. The method of claim 15 wherein the third images include every image of the set of images other than the first and second images.

20. The method of claim 15 wherein combining the inverse consistent deformation maps between the first and second image and the inverse consistent deformation maps between the first and second images via third images of the set other than the first and second images, performs an average of the combined inverse consistent deformation maps on an element by element basis.

21. The method of claim 20 wherein the average is according to the equation:

$$\vec{\Delta}_{ij}^{T3} = \frac{1}{N-1}\left(\vec{\Delta}_{ij}^{IC} + \sum_{k \in S} \vec{\Delta}_{ikj}^{IC}\right) \text{ where } S = \{s : s \in \{1, \ldots N\} \wedge s \neq i \wedge s \neq j\}$$

where $\vec{\Delta}_{ij}^{T3}$ is the transitive deformation map between the first and second image
and $\vec{\Delta}_{ij}^{IC}$ is the inverse consistent deformation maps between the first and second image
and $\vec{\Delta}_{ikj}^{IC}$ is the inverse consistent deformation maps between the first and second images via a third image.

* * * * *